(12) United States Patent
Li et al.

(10) Patent No.: US 12,199,388 B2
(45) Date of Patent: Jan. 14, 2025

(54) POWER DELIVERY DEVICE AND CONTROL METHOD OF POWER SUPPLY PATH

(71) Applicant: GETAC TECHNOLOGY CORPORATION, New Taipei (TW)

(72) Inventors: Chui-Hsien Li, Taipei (TW); Chin-Jung Chang, Taipei (TW)

(73) Assignee: Getac Technology Corporation, New Taipei City (TW)

( * ) Notice: Subject to any disclaimer, the term of this patent is extended or adjusted under 35 U.S.C. 154(b) by 2 days.

(21) Appl. No.: 17/980,497

(22) Filed: Nov. 3, 2022

(65) Prior Publication Data

US 2023/0238749 A1 Jul. 27, 2023

Related U.S. Application Data

(60) Provisional application No. 63/302,983, filed on Jan. 25, 2022.

(51) Int. Cl.
*H01R 13/703* (2006.01)
*G06F 1/26* (2006.01)
(Continued)

(52) U.S. Cl.
CPC ......... *H01R 13/7036* (2013.01); *G06F 1/263* (2013.01); *G06F 1/324* (2013.01);
(Continued)

(58) Field of Classification Search
CPC .. H01R 31/065; H01R 13/7036; G09G 5/006; G06F 3/1423; G06F 1/3296; G06F 1/324; G06F 1/263
See application file for complete search history.

(56) References Cited

U.S. PATENT DOCUMENTS

| 8,878,859 B1 | 11/2014 | van Scherrenburg |
| 2007/0018956 A1 | 1/2007 | Kim et al. |

(Continued)

FOREIGN PATENT DOCUMENTS

| CN | 102801322 A | 11/2012 |
| CN | 103412632 A | 11/2013 |

(Continued)

OTHER PUBLICATIONS

European Patent Office, Search Report, Application No. 22208803.1, Jun. 21, 2023, Germany.

*Primary Examiner* — Thomas J. Hiltunen
*Assistant Examiner* — Khareem E Almo
(74) *Attorney, Agent, or Firm* — Cooper Legal Group, LLC

(57) ABSTRACT

A control method of a power supply path includes detecting a plug-in state of a first connector through a configuration channel pin of the first connector; acquiring a plurality of rated voltages of a first power adaptor externally connected to the first connector and a rated current corresponding to each of the rated voltages; detecting a plug-in state of a second connector through a direct-current (DC) input pin of the second connector; acquiring a power quota of a second power adaptor externally connected to the second connector; selecting, from the plurality of rated voltages, the largest one that is not greater than an operating voltage, as a selected rated voltage; calculating a power quota of the selected rated voltage; and controlling a switching circuit to couple a power circuit to a power pin of one of the first and second connectors according to the two power quotas.

16 Claims, 4 Drawing Sheets

(51) Int. Cl.
  *G06F 1/324* (2019.01)
  *G06F 1/3296* (2019.01)
  *G06F 3/14* (2006.01)
  *G09G 5/00* (2006.01)
  *H01R 31/06* (2006.01)

(52) U.S. Cl.
  CPC .......... *G06F 1/3296* (2013.01); *G06F 3/1423* (2013.01); *G09G 5/006* (2013.01); *H01R 31/065* (2013.01); *G09G 2330/022* (2013.01); *G09G 2370/22* (2013.01)

(56) References Cited

U.S. PATENT DOCUMENTS

| | | |
|---|---|---|
| 2010/0097357 A1 | 4/2010 | Lin |
| 2010/0115314 A1 | 5/2010 | Sultenfuss |
| 2013/0110424 A1 | 5/2013 | Nagathil et al. |
| 2014/0253564 A1 | 9/2014 | Redman et al. |
| 2014/0310537 A1* | 10/2014 | Messick ................ G06F 1/3234 713/300 |
| 2016/0048189 A1 | 2/2016 | Bhardwaj et al. |
| 2016/0116969 A1 | 4/2016 | Biswas et al. |
| 2017/0222457 A1* | 8/2017 | Hijazi .................... G06F 1/263 |
| 2018/0175636 A1 | 6/2018 | Choi |
| 2020/0083740 A1* | 3/2020 | Sultenfuss ................ H02J 7/34 |
| 2020/0136593 A1* | 4/2020 | Chen ................... G06F 13/4022 |
| 2021/0232202 A1 | 7/2021 | Sultenfuss et al. |

FOREIGN PATENT DOCUMENTS

| | | |
|---|---|---|
| CN | 113741674 A | 12/2021 |
| TW | 201443772 A | 11/2014 |
| TW | 201835770 A | 10/2018 |
| TW | M593581 U | 4/2020 |
| TW | 202017287 A | 5/2020 |

\* cited by examiner

POWER DELIVERY DEVICE AND CONTROL METHOD OF POWER SUPPLY PATH

The application claims priority to U.S. Provisional Application No. 63/302,983, filed on Jan. 25, 2022, the disclosure of which is hereby incorporated by reference herein in its entirety.

BACKGROUND OF THE INVENTION

Field of the Invention

The present invention relates to a power control technique, and more particularly, to a power delivery device and a control method of a power supply path.

Description of the Prior Art

A common electronic device has only one single direct-current (DC) input terminal (for example, a DC input terminal designed by a manufacturer or a Universal Serial Bus (USB) power input terminal). However, different users may have different preferences and habits; for example, some users prefer to use the USB power input terminal, while others prefer to use the DC power input terminal. If an electronic device provides only one type of charging method, preferences and habits of all users may not be completely satisfied.

SUMMARY OF THE INVENTION

In one embodiment, a power delivery device includes a power circuit, a first connector, a second connector, a switching circuit and a control circuit. The first connector is adapted to be externally connected to a first power adaptor. The first connector includes a first power pin and a configuration channel pin. The second connector is adapted to be externally connected to a second power adaptor. The second connector includes a second power pin and a direct-current (DC) input pin. The switching circuit is connected to the power circuit, the first power pin and the second power pin, and is configured to couple the power circuit to one of the first power pin and the second power pin. The control circuit is connected to the power circuit, the configuration channel pin, the DC input pin and the switching circuit. The control circuit is configured to detect a plug-in state of a first connector through the configuration channel pin, acquire a plurality of rated voltages of the first power adaptor externally connected to the first connector and a rated current corresponding to each of the rated voltages, detect a plug-in state of a second connector through the DC input pin, acquire a power quota of the second power adaptor externally connected to the second connector, select, from the plurality of rated voltages, the largest one that is not greater than an operating voltage, as a selected rated voltage, calculate a power quota of the selected rated voltage, and control switching of the switching circuit according to the power quota of the second power adaptor and the power quota of the selected rated voltage.

In one embodiment, a control method of a power supply path includes detecting a plug-in state of a first connector through a configuration channel pin of the first connector; acquiring a plurality of rated voltages of a first power adaptor externally connected to the first connector and a rated current corresponding to each of the rated voltages; detecting a plug-in state of a second connector through a direct-current (DC) input pin of the second connector; acquiring a power quota of a second power adaptor externally connected to the second connector; selecting, from the plurality of rated voltages, the largest one that is not greater than an operating voltage, as a selected rated voltage; calculating a power quota of the selected rated voltage; and controlling switching of a switching circuit according to the power quota of the second power adaptor and the power quota of the selected rated voltage, wherein the switching circuit is configured to couple a power circuit to one of a first power pin of the first connector and a second power pin of the second connector.

In conclusion, the power delivery device and the control method of a power supply path according to any of the embodiments are capable of providing an input of multiple different external power supplies and selecting therefrom the external power supply with an optimal power supply ability as a power supply, achieving diversified charging means and further satisfying preferences and habits of different users.

DETAILED DESCRIPTION OF THE EMBODIMENTS

Figure 1:
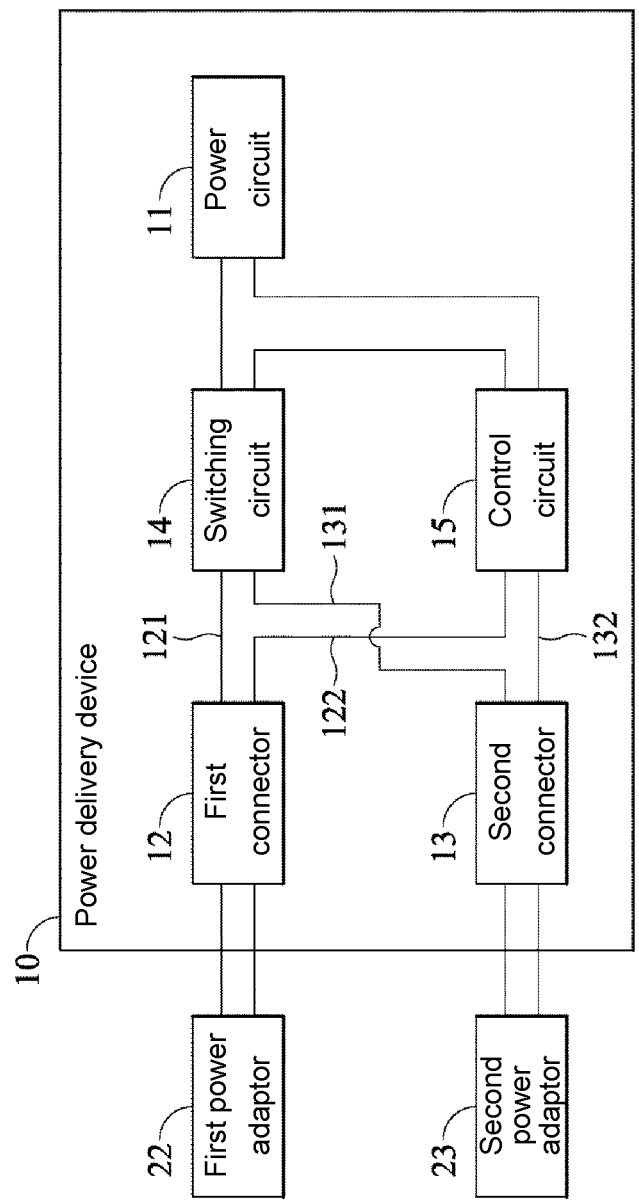
FIG. 1 is a block diagram of a power delivery device according to some embodiments.

Referring to FIG. 1, a power delivery device 10 includes a power circuit 11, a first connector 12, a second connector 13, a switching circuit 14 and a control circuit 15. The power delivery device 10 may be a chargeable device such as a laptop computer, a desktop computer or a tablet computer.

The power circuit 11 is configured to modulate and control charging/discharging of the power delivery device 10. For example, the power circuit 11 is configured to measure the amount of electricity of the power delivery device 10, convert a voltage input to the power delivery device 10 to a rated voltage of each element of the power delivery device 10, and/or stabilize an input voltage of the power delivery device 10. The power circuit 11 may convert the input voltage of the power delivery device 10 by means of boost (step-up) conversion and/or buck (step-down) conversion. In some embodiments, the power circuit 11 may be implemented by a gauge integrated circuit, a boost conversion circuit, a buck conversion circuit and/or a voltage regulator circuit.

Figure 2:
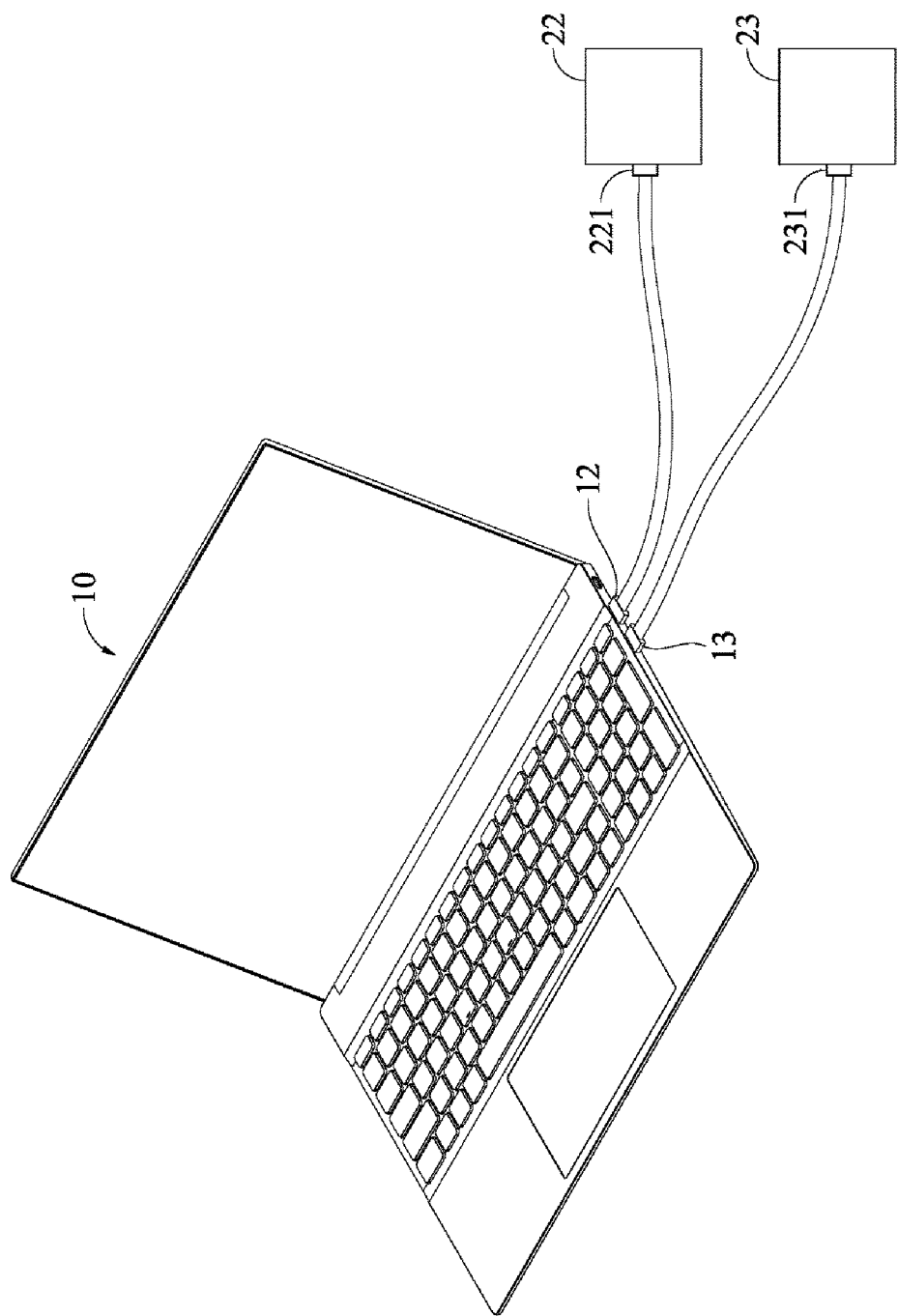
FIG. 2 is an appearance diagram of a power delivery device according to some embodiments.

Refer to FIG. 1 to FIG. 2. The first connector 12 is adapted to be externally connected to a first power adaptor 22. The second connector 13 is adapted to be externally connected to a second power adaptor 23. The first power adaptor 22 and the second power adaptor 23 may be alternating-current-to-direct-current (AC/DC) power adaptors. Herein, the first connector 12 and the second connector 13 are connection ports of different external interfaces. The first power adaptor 22 has a first connection port 221 matching the first connector 12, and the second power adaptor 23 has a second connection port 231 matching the second connector 13. When the first connector port 221 is connected to the first connector 12, the power delivery device 10 is allowed to sink a DC power supply from the first power adaptor 22 through the first connector 12. When the second connection port 231 is connected to the second connector 13, the power delivery device 10 is allowed to sink a DC power supply from the second power adaptor 23 through the second connector 13. That is to say, the first connector 12 and the first connection port 221 are a plug and a receptacle that match each other. The second connector 13 and the second connection port 231 are also a plug and a receptacle that match each other. The external interface of the first connector 12 may be, for example, Universal Serial Bus Type-C (USB-C). In other words, the first connector 12 may be a USB Type-C connector. The external interface of the second connector 13 may be, for example, a DC or USB interfaces before USB 3.0 (for example, USB-A, USB-B, micro-USB or mini-USB).

In one example, the first connector 12 and the first connection port 221 are USB-C connection ports that support charging techniques such as Universal Serial Bus Power Delivery (USB PD) or Quick Charge (QC), and the second connector 13 and the second connection port 231 are DC connectors. For example, the first connection port 221 is a USB-C plug, the first connector 12 is a USB-C receptacle, and the USB-C plug and the USB-C receptacle support the same charging technique (for example, USB PD 3.1). The second connection port 231 is a DC plug, and the second connector 13 is a DC receptacle.

The first connector 12 includes a power pin (hereinafter referred to as a first power pin 121) and a configuration channel (CC) pin 122. The first power pin 121 and the configuration channel pin 122 may be implemented by conductive terminals in the plug or the receptacle. The first power pin 121 may be, for example, a power supply pin (VBus) or a power supply pin (VBus) and a ground pin (GND). In addition to the first power pin 121 and the configuration channel pin 122, the first connector 122 may include other types of pins according to definitions of the external interface supported. For example, assuming that the first connector 12 is a USB Type-C connector, the first connector 12 may further include a positive data pin (D+), a negative data pin (D−), a ground pin (GND), a high-speed transmission pin (TX and RX), a low-speed transmission pin (SUB) and a cable power supply pin (Vconn).

The second connector 13 includes a power pin (hereinafter referred to as a second power pin 131) and a DC input pin 132. For example, assuming that the second connector 13 is a DC connector, the second power pin 131 may be implemented by a positive power terminal of the DC connector, and the DC input pin 132 may be implemented by a positive power terminal of the DC connector. In another example, when the second connector 13 is a connection port in a USB interface before USB 3.0, the second connector 13 may include a power supply pin (VBus), a ground pin (GND), a positive data pin (D+) and a negative data pin (D−). In this case, the second power pin 131 may be implemented by a power supply pin and a ground pin, and the DC input pin 132 may be implemented by a power supply pin.

The control circuit 15 is connected to the power circuit 11, the configuration channel pin 122, the DC input pin 132 and the switching circuit 14. In some embodiments, the control circuit 15 may be implemented by a microcontroller or a system-on-chip.

The switching circuit 14 is connected to the power circuit 11, the first power pin 121 and the second power pin 131. More specifically, the switching circuit 14 is connected between the power circuit 11 and the first power pin 121, and connected between the power circuit 11 and the second power pin 131. The switching circuit 14 has three transmission terminals (hereinafter referred to as a first terminal, a second terminal and a third terminal) and a control terminal. The first terminal of the switching circuit 14 is connected to the power circuit 11, the second terminal of the switching circuit 14 is connected to the first power pin 121, and the third terminal of the switching circuit 14 is connected to the second power pin 131. The control terminal of the switching circuit 14 is connected to the control circuit 15. Thus, the switching circuit 14 is controlled by the control circuit 15. The switching circuit 14 couples the power circuit 11 to one of the first power pin 121 and the second power pin 131 according to control of the control circuit 15. When the switching circuit 14 enables the conduction between the first terminal and the second terminal, the power circuit 11 is electrically connected to the first power pin 121 through the conduction path between the first terminal and the second terminal of the switching circuit 14. At this point in time, the switching circuit 14 disconnects the first terminal from the third terminal (conduction is disabled), further disconnecting the power circuit 11 from the second power pin 131 (conduction is disabled). At this point in time, the power circuit 11 can sink only DC power from the first power adaptor 22 (specifically, a power quota of a selected rated voltage to be described shortly). When the switching circuit 14 enables the conduction between the first terminal and the third terminal, the power circuit 11 is electrically connected to the second power pin 131 through the conduction path between the first terminal and the third terminal of the switching circuit 14. At this point in time, the switching circuit 14 disconnects the first terminal from the second terminal (conduction is disabled), further disconnecting the power circuit 11 from the first power pin 121 (conduction is disabled). At this point in time, the power circuit 11 can sink only DC power from the second power adaptor 23 (specifically, a power quota of the second power adaptor 23 to be described shortly). In some embodiments, the switching circuit 14 may be implemented by an electronic switch (for example, a transistor).

Figure 3:
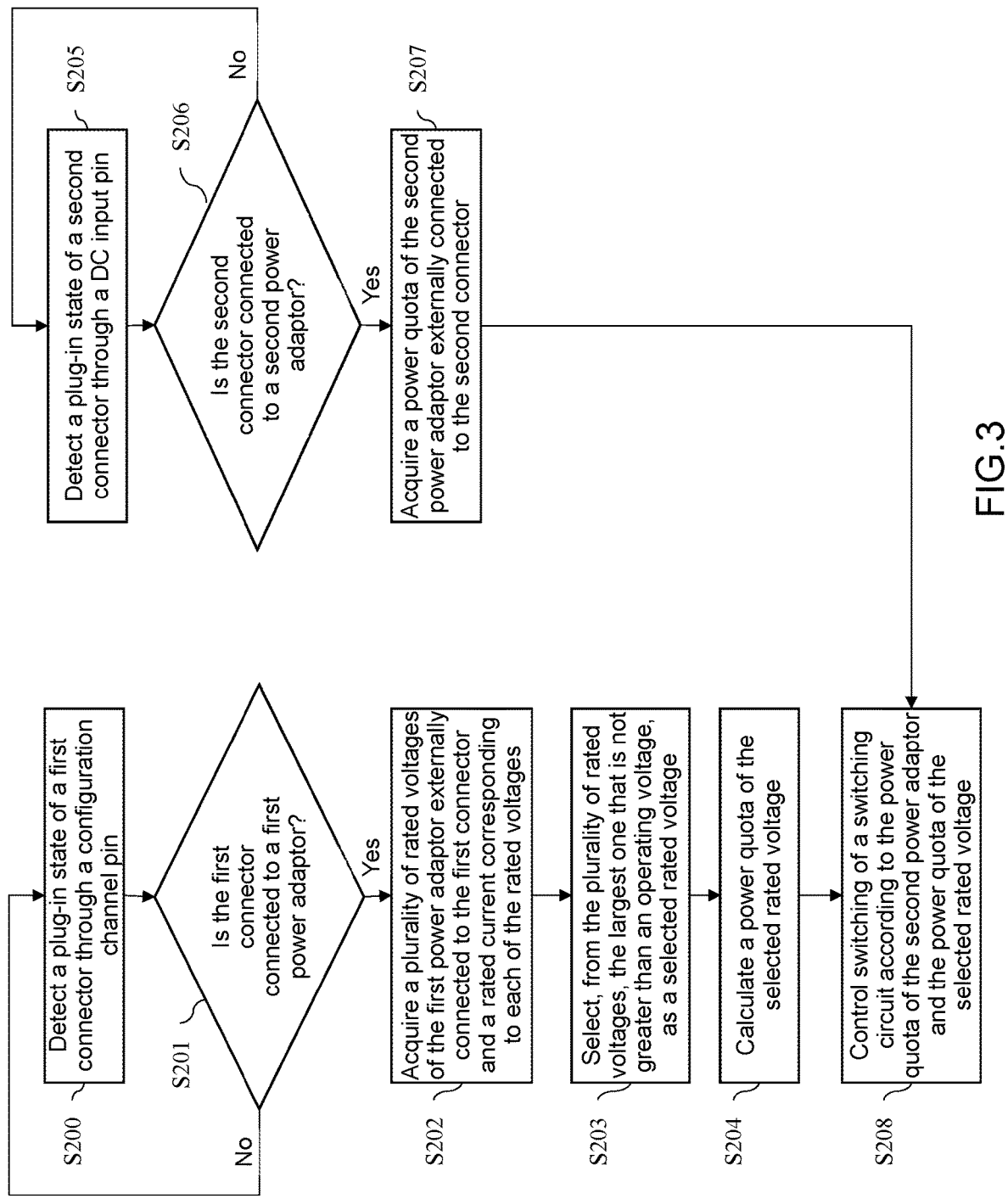
FIG. 3 is a flowchart of a control method of a power supply path according to some embodiments.

Referring to FIG. 1 and FIG. 3, when the second power adaptor 23 is connected to the second connector 13, the control circuit 15 detects a plug-in state of the first connector 12 through the configuration channel pin 122 (step S200), that is, determining whether the first connector 12 is connected to the first power adaptor 22 (step S201). For example, the control circuit 15 receives a voltage level of the configuration channel pin 122, and determines according to whether the voltage level of the configuration channel pin 122 is greater than a first threshold whether the first connector 12 is connected to the first power adaptor 22. Specifically, the first power adaptor 22 has a pull-up resistor, and a configuration channel terminal connected to the pull-up resistor. The first connector 12 has a pull-down resistor connected to the configuration channel pin 122. When the first connector 12 is not yet externally connected to the first power adaptor 22, the configuration channel pin 122 is pulled down by the pull-down resistor to a low voltage level that is not greater than the first threshold. Conversely, when the first connector 12 is externally connected to the first power adaptor 22, the configuration channel pin 122 is connected to the configuration channel terminal, such that the voltage level of the configuration channel pin 122 is pulled up by the pull-up resistor electrically connected thereto to a high voltage level that is greater than the first threshold. As such, when the control circuit 15 detects that the voltage level of the configuration channel pin 122 is greater than the first threshold, the control circuit 15 can accordingly determine that the first connector 12 is connected to the first power adaptor 22. Conversely, when the control circuit 15 detects that the voltage level of the configuration channel pin 122 is not greater than a predetermined threshold, the control circuit 15 can accordingly determine that the first connector 12 is not yet connected to the first power adaptor 22.

Once the first connector 12 is externally connected to the first power adaptor 22, the control circuit 15 acquires a plurality of rated voltages of the first power adaptor 22 externally connected to the first connector 12 and a rated current corresponding to each of the rated voltages (step S202). For example, once the first connector 12 is externally connected to the first power adaptor 22, the control circuit 15 receives through the configuration channel pin 122 a power supply ability signal sent from the configuration channel terminal of the first power adaptor 22. The power supply ability signal includes power options of the first power adaptor 22. The power options contain the plurality of rated voltages and the rated current corresponding to each of the rated voltages. A combination formed by each of the rated voltages and the corresponding rated current satisfies USB charging standard specifications; for example, 5 V and 3 A, 9 V and 3 A, 15 V and 3 A, 15 V and 2 A, 20 V and 3.5 A, 28 V and 5 V, 36 V and 5 A, and 48 V and 5 A. The control circuit 15 acquires the power supply ability signal through the configuration channel pin 122, and analyzes the power supply ability signal to acquire the plurality of rated voltages and the rated current corresponding to each of the rated voltages in the power options.

Once the control circuit 15 acquires the plurality of rated voltages and the rated current corresponding to each of the rated voltages, the control circuit 15 selects, from the plurality of rated voltages, the largest one that is not greater than an operating voltage, as a selected rated voltage (step S203). The operating voltage may be a maximum voltage that can be withstood during the operation of the power delivery device 10. Once the control circuit 15 has selected the selected rated voltage, a power supply request signal is generated according to the selected rated voltage and the corresponding rated current, and the power supply request signal is sent to the configuration channel terminal through the configuration channel pin 122. The first power adaptor 22 acquires the power supply request signal though the configuration channel terminal, and powers the power delivery device 10 according to the selected rated voltage and the corresponding rated current in response to the power supply request signal.

Once the control circuit 15 acquires the selected rated voltage, the control circuit 15 calculates a power quota of the selected rated voltage (step S204). In some embodiments, the control circuit 15 calculates the power quota of the selected rated voltage according to the selected rated voltage and the corresponding rated current. Specifically, the control circuit 15 calculates the power quota of the selected rated voltage by multiplying the selected rated voltage by the corresponding rated current.

The control circuit 15 further detects a plug-in state of the second connector 13 through the DC input pin 132 (step S205), that is, determining whether the second connector 13 is connected to the second power adaptor 23 (step S206). For example, the control circuit 15 detects a voltage level of the DC input pin 132 as a plug-in state, and determines accordingly to whether the voltage level of the DC input pin 132 is greater than a second threshold whether the second connector 13 is connected to the second power adaptor 23. Specifically, the second connector 13 has a pull-down resistor connected to the DC input pin 132. When the second connector 13 is not yet externally connected to the second power adaptor 23, the DC input pin 132 is pulled down by the pull-down resistor to a low voltage level that is not greater than the second threshold. When the second connector 13 is externally connected to the second power adaptor 23, the power supply voltage of the second power adaptor 23 pulls up the DC input pin 132 to a high voltage level that is greater than the second threshold. As such, when the voltage level of the DC input pin 132 is greater than the second threshold, the control circuit 15 can accordingly determine that the second connector 13 is connected to the second power adaptor 23. When the voltage level of the DC input pin 132 is not greater than the second threshold, the control circuit 15 can accordingly determine that the second connector 13 is not yet connected to the second power adaptor 23. In some embodiments, the first threshold may be equal to or different from the second threshold.

Once the second connector 13 is externally connected to the second power adaptor 23, the control circuit 15 acquires a power quota of the second power adaptor 23 externally connected to the second connector 13 (step S207). For example, the control circuit 15 detects the power supply voltage and the power supply current of the second power adaptor 23 through the DC input pin 132, and multiplies the power supply voltage by the power supply current to acquire a power quota of the second power adaptor 23.

Once the control circuit 15 has acquired the power quota of the selected rated voltage and the power quota of the second power adaptor 23, the control circuit 15 controls switching of the switching circuit 14 according to the power quota (referred to as a first power quota) of the second power adaptor 23 and the power quota (referred to as a second power quota) of the selected rated voltage (step S208). In some embodiments, the control circuit 15 compares the first power quota and the second power quota. When the first power quota is greater than the second power quota, the control circuit 15 controls the switching circuit 14 to couple the power circuit 11 to the second power pin 131, thereby coupling the power circuit 11 to the second power adaptor 23. When the second power quota is greater than the first power quota, the control circuit 15 controls the switching circuit 14 to couple the power circuit 11 to the first power pin 121, thereby coupling the power circuit 11 to the first power adaptor 22. That is to say, the switching circuit 14 couples, under the control of the control circuit 15, the power circuit 11 to one of the first power adaptor 22 and the second power adaptor 23 that has the larger power quota.

In some embodiments, the control circuit 15 is configured to further acquire, through the configuration channel pin 122, the power supply voltage of the first power adaptor 22 externally connected to the first connector 12 (that is, a voltage actually provided by the first power adaptor 22). When the power supply voltage of the first power adaptor 22 is different from the selected rated voltage selected in step S203, the control circuit 15 notifies the first power adaptor 22 through the configuration channel pin 122 of setting the power supply voltage to the selected rated voltage. That is to say, the control circuit 15 sends a request signal to the first power adaptor 22 through the configuration channel pin 122, so that the first power adaptor 22 uses, in response to the request signal, the selected rated voltage as the voltage actually provided for powering the power delivery device 10.

Figure 4:
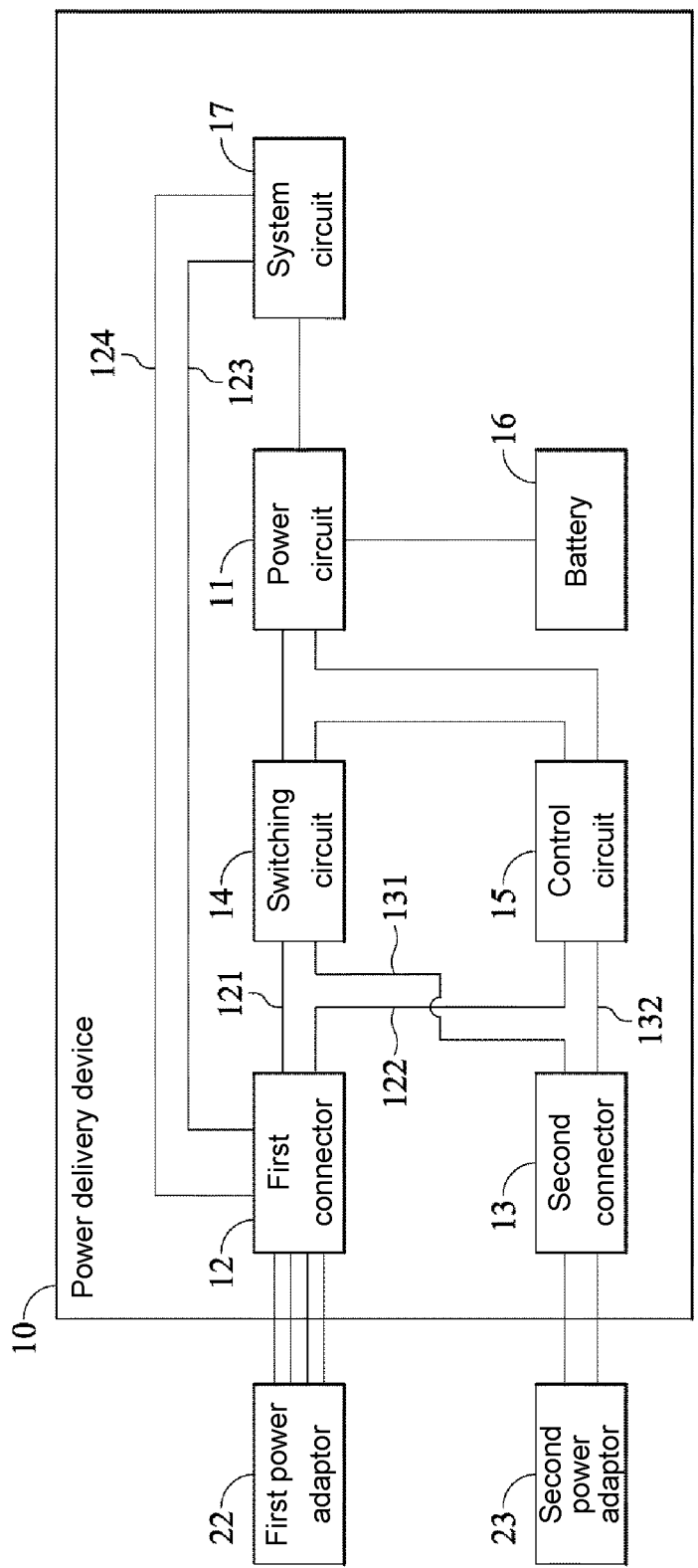
FIG. 4 is a block diagram of a power delivery device according to some embodiments.

Referring to FIG. 4, in some embodiments, the power delivery device 10 further includes a battery 16 and a system circuit 17. The battery 16 is connected to the power circuit

11. The system circuit 17 is connected to the first connector 12. The battery 16 is configured to store power. In other words, in addition to sinking power from the first power adaptor 22 or the power from the second power adaptor 23 through the switching circuit 14, each element in the power delivery device 10 may also sink power from the battery 16. The system circuit 17 may include a peripheral device and a computing device. The peripheral device is, for example but not limited to, a display device, an audio device, a communication interface or an input/output interface. The computing device is, for example but not limited to, a central processor, a microprocessor or a system-on-chip. The system circuit 17 is capable of processing certain data. For example, the system circuit 17 may acquire, through the positive data pin 123 (D+) and the negative data pin 124 (D−) of the first connector 12, data signals of an electronic device connected to the first power adaptor 22, and then analyze the data signals. The electronic device is, for example but not limited to, a USB communication control device (communications and CDC control, e.g., a network card, a modem or a serial port), a human-machine interface device (e.g., a keyboard or a mouse), a physical interface device (e.g., a joystick), a still image capturing device (e.g., an image scanner), a printing device (a printer), a mass storage device (e.g., a portable disk drive, a mobile hard drive, a memory card, or a digital camera), a USB hub, a communication device (a CDC-date, e.g., a modem and a fax machine), a smart card device (e.g., a card reader), a video device (e.g., a network camera), an audio/video interface (e.g., a television), or a wireless transmission device (e.g., a Bluetooth wireless controller).

In conclusion, the power delivery device and the control method of a power supply path according to any of the embodiments are capable of providing an input of multiple different external power supplies and selecting therefrom the external power supply with an optimal power supply ability as a power supply, achieving diversified charging means and further satisfying preferences and habits of different users.

What is claimed is:

1. A power delivery device, comprising:
   a power circuit;
   a first connector, adapted to be externally connected to a first power adaptor, the first connector comprising a first power pin and a configuration channel pin;
   a second connector, adapted to be externally connected to a second power adaptor, the second connector comprising a second power pin and a direct-current (DC) input pin;
   a switching circuit, connected to the power circuit, the first power pin and the second power pin, the switching circuit configured to couple the power circuit to one of the first power pin or the second power pin; and
   a control circuit, connected to the power circuit, the configuration channel pin, the DC input pin and the switching circuit, the control circuit configured to detect a plug-in state of the first connector through the configuration channel pin, acquire a plurality of rated voltages of the first power adaptor externally connected to the first connector and a rated current corresponding to each of the plurality of rated voltages, detect a plug-in state of the second connector through the DC input pin, acquire a power quota of the second power adaptor externally connected to the second connector, select, from the plurality of rated voltages, a largest one of the plurality of rated voltages that is not greater than an operating voltage, as a selected rated voltage, calculate a power quota of the selected rated voltage, and control switching of the switching circuit according to the power quota of the second power adaptor and the power quota of the selected rated voltage,
   wherein the control circuit is configured to further acquire, through the configuration channel pin, a power supply voltage of the first power adaptor externally connected to the first connector, and notify the first power adaptor through the configuration channel pin of setting the power supply voltage of the first power adaptor to the selected rated voltage when the power supply voltage of the first power adaptor is not the selected rated voltage.

2. The power delivery device according to claim 1, wherein the control circuit controls the switching circuit to couple the power circuit to one of the first power adaptor or the second power adaptor that has a larger power quota.

3. The power delivery device according to claim 1, wherein the first connector is a Universal Serial Bus (USB) Type-C connector.

4. The power delivery device according to claim 1, wherein the control circuit calculates the power quota of the selected rated voltage according to the selected rated voltage and the corresponding rated current.

5. A control method of a power supply path, comprising:
   detecting a plug-in state of a first connector through a configuration channel pin of the first connector;
   acquiring a plurality of rated voltages of a first power adaptor externally connected to the first connector and a rated current corresponding to each of the plurality of rated voltages;
   detecting a plug-in state of a second connector through a direct-current (DC) input pin of the second connector;
   acquiring a power quota of a second power adaptor externally connected to the second connector;
   selecting, from the plurality of rated voltages, a largest one of the plurality of rated voltages that is not greater than an operating voltage, as a selected rated voltage;
   calculating a power quota of the selected rated voltage;
   controlling switching of a switching circuit according to the power quota of the second power adaptor and the power quota of the selected rated voltage, wherein the switching circuit is configured to couple a power circuit to one of a first power pin of the first connector or a second power pin of the second connector;
   acquiring, through the configuration channel pin, a power supply voltage of the first power adaptor externally connected to the first connector; and
   when the power supply voltage of the first power adaptor is not the selected rated voltage, notifying the first power adaptor through the configuration channel pin of setting the power supply voltage of the first power adaptor to the selected rated voltage.

6. The control method of a power supply path according to claim 5, wherein the switching circuit couples the power circuit to one of the first power adaptor or the second power adaptor that has a larger power quota.

7. The control method of a power supply path according to claim 5, wherein the first connector is a Universal Serial Bus (USB) Type-C connector.

8. The control method of a power supply path according to claim 5, wherein the power quota of the selected rated voltage is calculated according to the selected rated voltage and the corresponding rated current.

9. The control method of a power supply path according to claim 5, wherein acquiring the power quota of the second power adaptor comprises calculating the power quota of the second power adaptor based on a detected power supply voltage of the second power adaptor and a detected power supply current of the second power adaptor through the DC input pin.

10. The control method of a power supply path according to claim 9, wherein calculating the power quota of the second power adaptor based on the detected power supply voltage of the second power adaptor and the detected power supply current of the second power adaptor through the DC input pin comprises multiplying the detected power supply voltage of the second power adaptor by the detected power supply current of the second power adaptor to acquire the power quota of the second power adaptor.

11. The control method of a power supply path according to claim 5, wherein detecting the plug-in state of the first connector comprises determining whether a voltage level of the configuration channel pin is greater than a specified threshold.

12. The power delivery device according to claim 1, wherein the first connector comprises a pull-down resistor connected to the configuration channel pin, and the pull-down resistor is configured to pull down a voltage at the configuration channel pin to a voltage level below a specified threshold when the first power adaptor is not connected to the first connector.

13. The power delivery device according to claim 12, wherein the control circuit is configured to detect the plug-in state of the first connector based upon whether the voltage at the configuration channel pin is greater than the specified threshold.

14. The power delivery device according to claim 13, wherein the control circuit is configured to determine that the first power adaptor is externally connected to the first connector when the voltage level of the configuration channel pin is greater than the specified threshold.

15. The power delivery device according to claim 1, wherein the control circuit is configured to acquire the power quota of the second power adaptor by calculating the power quota of the second power adaptor based on a detected power supply voltage of the second power adaptor and a detected power supply current of the second power adaptor through the DC input pin.

16. The power delivery device according to claim 15, wherein the control circuit is configured to calculate the power quota of the second power adaptor based on the detected power supply voltage of the second power adaptor and the detected power supply current of the second power adaptor through the DC input pin by multiplying the detected power supply voltage of the second power adaptor by the detected power supply current of the second power adaptor to acquire the power quota of the second power adaptor.

* * * * *